United States Patent [19]
Coutant

[11] Patent Number: 5,868,640
[45] Date of Patent: Feb. 9, 1999

[54] HYDROMECHANICAL TRANSMISSION HAVING FOUR MEMBERS AND TWO PLANETARIES

[75] Inventor: Alan R. Coutant, Chillicothe, Ill.

[73] Assignee: Caterpillar Inc., Peoria, Ill.

[21] Appl. No.: 759,903

[22] Filed: Dec. 4, 1996

[51] Int. Cl.⁶ .................................................. F16H 47/04
[52] U.S. Cl. ............................................. 475/72; 475/78
[58] Field of Search ................................ 475/72, 74, 78, 475/82

[56] References Cited

U.S. PATENT DOCUMENTS

| | | | |
|---|---|---|---|
| 3,969,958 | 7/1976 | Miyao et al. | 475/82 |
| 5,113,723 | 5/1992 | Ishino et al. | 475/72 X |
| 5,129,867 | 7/1992 | Fredrikson et al. | 475/74 X |
| 5,156,577 | 10/1992 | Fredrikson et al. | 475/74 |
| 5,159,855 | 11/1992 | Nikolaus et al. | 475/78 X |
| 5,248,283 | 9/1993 | Eckhardt et al. | 475/72 |
| 5,466,197 | 11/1995 | Mitsuya et al. | 475/72 |
| 5,667,452 | 9/1997 | Coutant | 475/72 X |

FOREIGN PATENT DOCUMENTS

WO 91/01460  2/1991  WIPO .

*Primary Examiner*—Dirk Wright
*Assistant Examiner*—Peter T. Kwon
*Attorney, Agent, or Firm*—Calvin E. Glastetter

[57] ABSTRACT

A hydromechanical transmission includes a hydrostatic transmission, a mechanical transmission having a planetary gearing mechanism, both being driven by an engine. The output of the hydrostatic transmission interacts with the mechanical transmission to provide infinitely adjustable power flow through the hydromechanical transmission. The planetary gearing mechanism includes two planetary gear sets and four members to connect the hydromechanical transmission to an output.

11 Claims, 4 Drawing Sheets

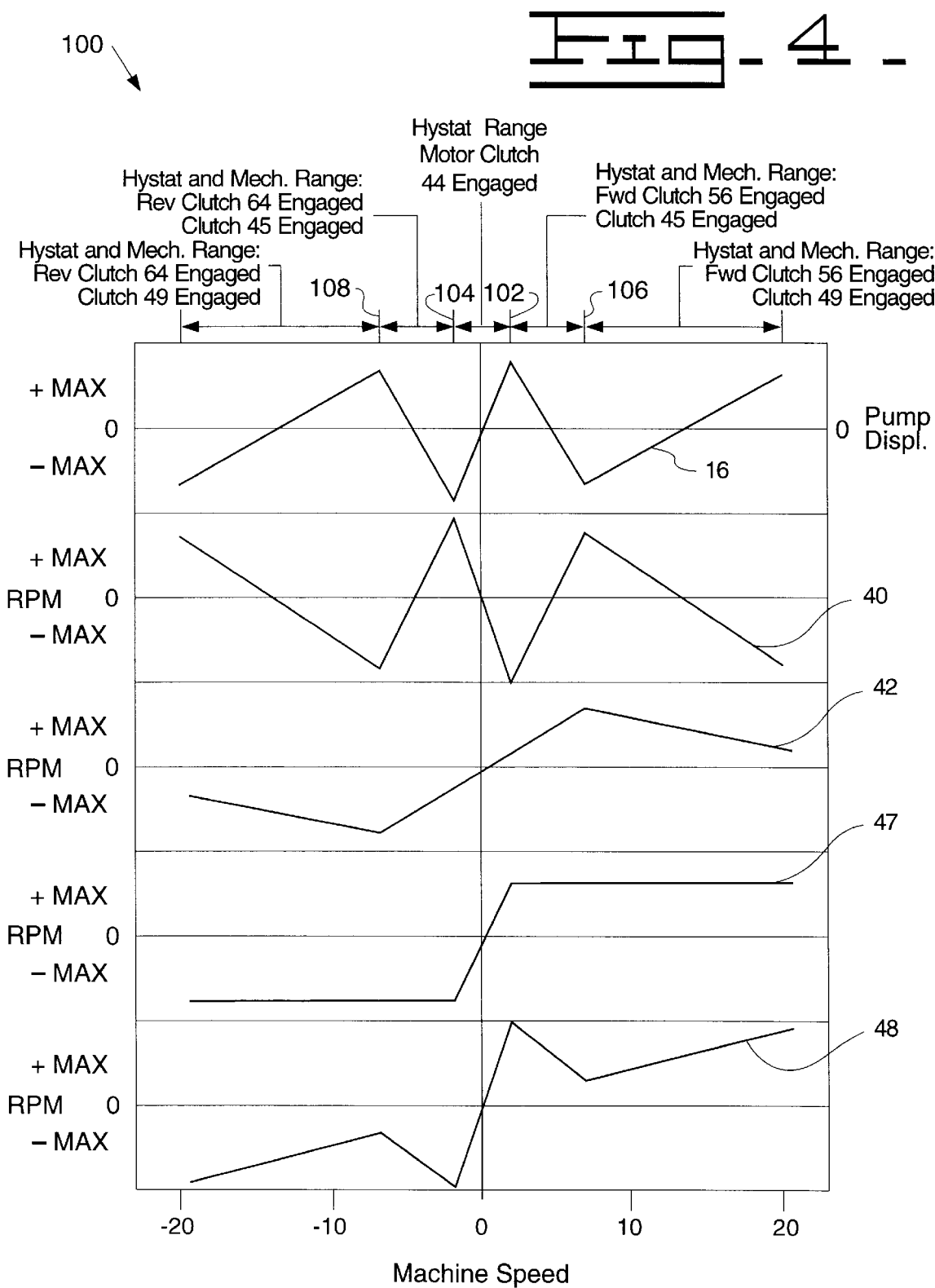

HYDROMECHANICAL TRANSMISSION HAVING FOUR MEMBERS AND TWO PLANETARIES

TECHNICAL FIELD

This invention relates generally to a hydromechanical transmission and more particularly to a planetary gearing mechanism having four members and two planetary gear sets.

BACKGROUND ART

In a machine, such as a wheel loader or track type tractor, for example, an engine supplies power for propelling the machine in the forward or reverse directions as well as supply power for machine implements. A transmission is coupled to the engine and transmits power from the engine to the drivetrain to propel the machine. It is desirable to utilize a continuously variable transmission and manage the transmission ratio to thereby save engine power for the implements and also to provide a continuously variable power flow through the transmission to improve machine productivity. Because machines operate at relatively low speeds and in cyclical work routines, there is a need to control speed precisely at low speeds and to be infinitely adjustable throughout the full range. One of the problems associated with such an arrangement is to match the hydromechanical transmission arrangements to the type of work being performed by the machine using a transmission having four members and two planetary gear sets.

The present invention is directed to overcoming one or more of the problems as set forth above.

DISCLOSURE OF THE INVENTION

In one aspect of the present invention a hydromechanical transmission having a hydrostatic transmission, a directional mechanism and an output is provided. The hydromechanical transmission includes a planetary gearing mechanism. A first member of the planetary gearing mechanism is connected to the hydrostatic transmission. A second member of the planetary gearing mechanism is selectively connected to the hydrostatic transmission and selectively connected to the output. A third member of the planetary gearing mechanism is connectable to the directional mechanism. A fourth member of the planetary gearing mechanism is selectively connectable to the output.

BRIEF DESCRIPTION OF THE DRAWINGS

FIG. 4 is a schematic representation of a graph showing the change in the various components relative to machine speed.

BEST MODE FOR CARRYING OUT THE INVENTION

Figure 1:
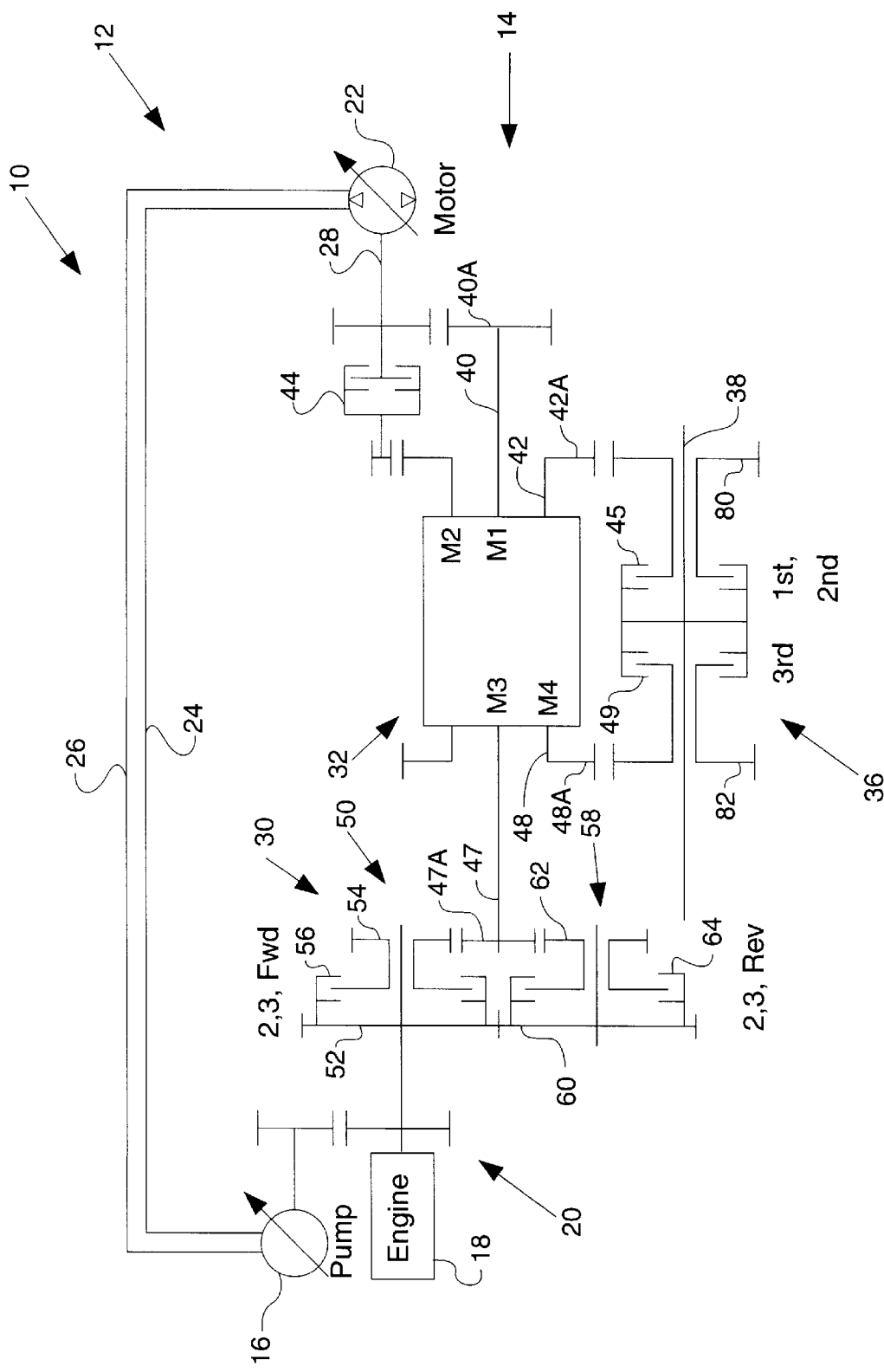
FIG. 1 is a schematic view of a transmission showing the present invention of four members of the planetary arrangement.

Referring to FIG. 1, a hydromechanical transmission arrangement 10 includes a hydrostatic transmission 12 and a mechanical transmission 14. The hydromechanical transmission 10 is used to propel a machine, not shown. The hydrostatic transmission 12 includes a variable displacement pump 16 drivingly connected to an engine 18 through a pump drive arrangement 20. A motor 22 is fluidly connected to the pump through conduits 24,26. The hydrostatic transmission can use a variable displacement motor or a fixed displacement motor without departing from the scope of the invention. An electric generator and electric motor could be used in place of the hydrostatic transmission without departing from the scope of the invention. An output shaft 28 extends from the motor 22 and is operative to transmit torque therefrom.

The mechanical transmission 14 includes a directional mechanism 30, a planetary gearing mechanism 32 and a gear change mechanism 36 having an output 38. The gear change mechanism 36 controls the ratio of the transmission by engagement of clutches to connect gears to the output 38. A first member 40 of the planetary gearing mechanism 32 is connected to the output shaft 28 of the motor 22 by a gear 40A. A second member 42 of the planetary gearing mechanism 32 includes a gear 42A selectively connectable to the output shaft 28 of the motor 22 by engagement of a motor clutch 44 to achieve first or low gear speed. The gear 42A of the second member 42 is also selectively connectable to the output 38 by engagement of a first clutch 45 within the gear change mechanism 36 to achieve first and second gear speed. A third member 47 of the planetary gearing mechanism 32 is connectable to the directional mechanism 30 by a gear 47A. A fourth member 48 of the planetary gearing mechanism 32 includes a gear 48A connectable to the output 38 by engagement of a second clutch 49 within the gear change mechanism 36 to achieve third gear speed. The members 40,42,47,48 can each comprise one or more elements of the planetary gearing mechanism 32 and a respective gear 40A,42A,47A,48A to function as one member.

An example of a directional mechanism 30 is shown as being connected to the third member 47. The directional mechanism 30 includes a first gear mechanism 50 having an input 52 drivingly connected to the engine 18 and an output 54 with a first fluid actuated forward directional clutch 56 disposed therebetween. When the first directional clutch 56 and either clutch 45,49 are engaged a forward direction of the machine is achieved. A second gear mechanism 58 has an input 60 drivingly connected to the engine 18 and an output 62 with a second fluid actuated reverse directional clutch 64 disposed therebetween. When the second directional clutch 64 and either clutch 45,49 are engaged a reverse direction of the machine is achieved. When both clutches 56,64 are disengaged the directional mechanism is in neutral with no power being transmitted from the directional mechanism 30 to the planetary gearing mechanism 32. Other types of directional mechanisms could be used without departing from the scope of the invention.

Figure 2:
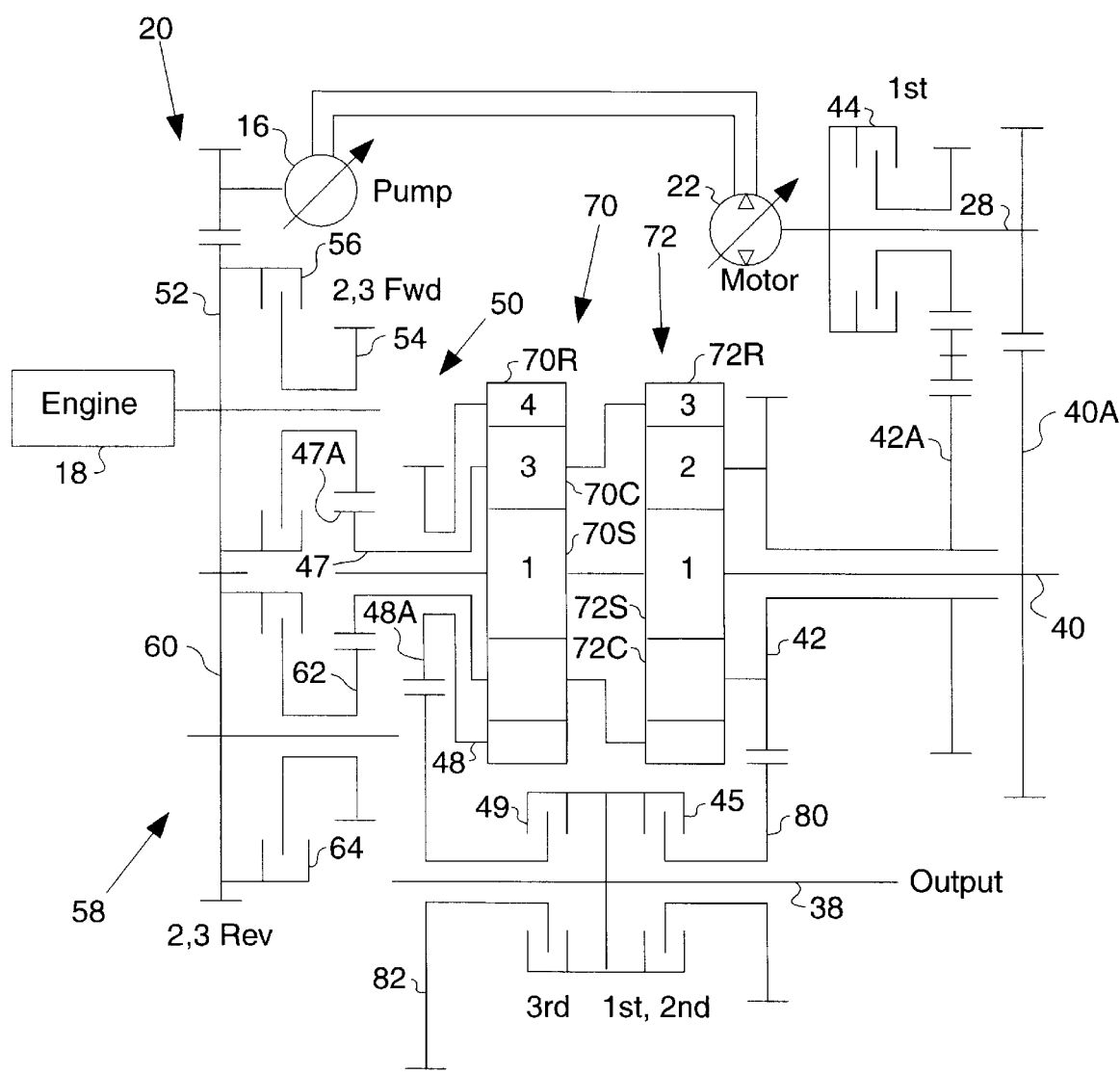
FIG. 2 is a schematic view of a transmission arrangement showing the four members of the two planetaries.
Figure 3:
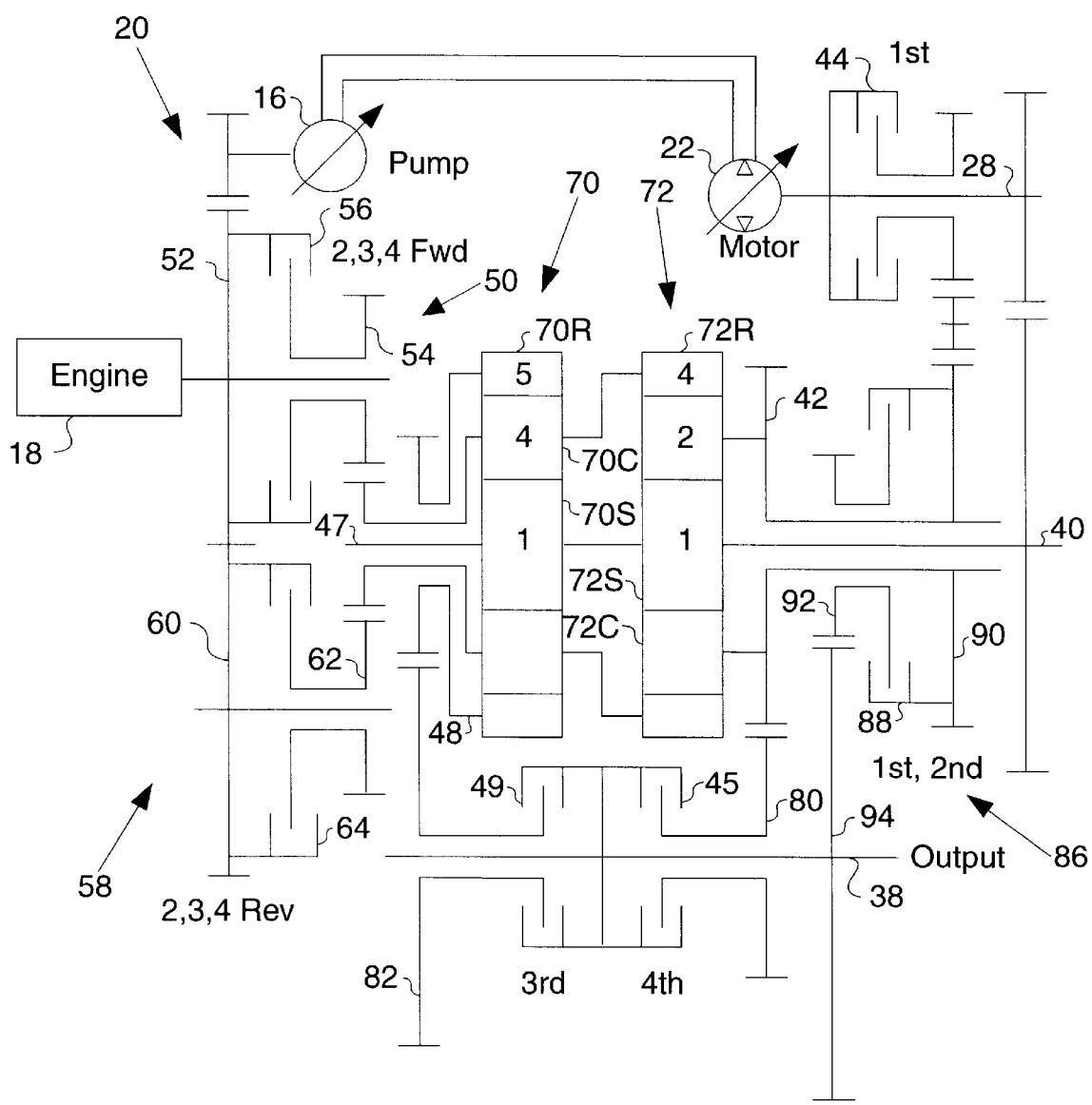
FIG. 3 is a schematic view showing an alternate transmission arrangement.

Now referring to FIGS. 2 and 3, reference numerals of components previously described will be repeated. The pump 16 and motor 22 are shown as being variable displacement. A fixed displacement motor can be used without departing from the scope of the invention.

The planetary gearing mechanism 32 includes a first planetary gear set 70 and a second planetary gear set 72. Each planetary gear set 70,72 includes elements such as a sun gear, a carrier with planets, a ring gear. The first planetary gear set 70 includes a sun gear 70S, a carrier 70C and a ring 70R. The second planetary gear set 72 includes a sun gear 72S, a carrier 72C and a ring gear 72R. The members 40,42,47,48 comprise one or more elements of the planetary gear sets 70,72 which are connected together to function as one member. The first member 40 includes the sun gears 70S.72S and is connected to the output shaft 28 of the motor 22 for rotation with the motor shaft 28. The second member 42 includes the carrier 72C and is selectively connectable to the motor shaft 28 by engagement of the motor clutch 44 and is also selectively connected to the output 38 by engagement of the first clutch 45 of the gear change mechanism 36. The third member 47 includes the carrier 70C, the ring gear 72R and is connectable to the directional mechanism 30. The fourth member 48 includes the ring gear 70R and is connectable to the output 38 by engagement of the second clutch 49 of the gear change mechanism 36.

Referring to FIG. 2, a three speed hydromechanical transmission arrangement 10 is shown. When the operator selects a forward direction the motor clutch 44 is engaged to connect the motor shaft 28 to the gear 42A of the second member 42, the first clutch 45 is also engaged to connect an intermediate gear 80 to the output 38 thus connecting the gear 42A of the second member 42 to output 38 through the intermediate gear 80 for first gear. For second gear speed the first clutch 45 remains engaged, the motor clutch 44 is disengaged and the forward directional clutch 56 is engaged. For third gear speed the directional clutch 56 remains engaged, the first clutch 45 is disengaged, the second clutch 49 is engaged to connect an intermediate gear 82 to the output 38 thus connecting the gear 48A of the fourth member 48 to the output 38 through the intermediate gear 82. For reverse direction the reverse directional clutch 64 is used for second and third gear.

Referring to FIG. 3 a four speed hydromechanical transmission arrangement 10 is shown. Reference numerals of components previously described will be repeated. A second gear change mechanism 86 is added in order to provide more gear speeds. The second gear change mechanism 86 includes a clutch 88 having, a first component 90 connected to motor clutch 44 and the second member 42, a second component 92 connected to a gear 94 which is attached to the output 38. When the operator selects the forward direction the motor clutch 44 is engaged thus connecting the motor shaft 28 to the first component 90, the clutch 88 of the second gear change mechanism is also engaged thus connecting the first component 90 to the gear 94 of the output 38 to achieve first gear speed. For second gear speed the clutch 88 remains engaged, the motor clutch 44 is disengaged, the forward directional clutch 56 is engaged. For third gear speed the forward directional clutch 56 remains engaged, the clutch 88 is disengaged, the second clutch 49 of the gear change mechanism 36 engaged to connect the gear 48A of the fourth member 48, through the gear 82, to the output 38. For fourth gear speed the forward directional clutch 56 remains engaged, the second clutch 49 is disengaged, the first clutch 45 gear change mechanism 36 is engaged to connect the gear 42A of the second member 42, through the gear 80, to the output 38.

Referring to FIG. 4, a graph 100 discloses the changes in the pump 16 and the various members 40,42,47,48 as the machine speed increases from a stop until maximum speed is achieved in both forward and reverse direction. The graph 100 shows the changes to the various members with an example of a general connection as shown in FIGS. 1 and 2. The motor clutch 44 for first or low forward gear speed is disengaged and the high forward directional clutch 56 is engaged at line 102. The motor clutch 44 for first or low reverse gear speed is disengaged and the high reverse directional clutch 64 is engaged at line 104. At lines 106,108 the first clutch 45 is disengaged and the second clutch 49 is engaged to shift to a higher gear. A plurality of data lines 16,40,42,47,48 on the graph 100 have reference numerals corresponding to the reference numerals of the pump 16 and the four members 40,42,47,48. The line 16 represents the displacement of the pump 16. The line 40 represents the speed of the first member as machine speed increases. The line 42 represents the speed of the second member 42 with the motor clutch 44 engaged and disengaged as machine speed increases. The line 47 represents the speed of the third member 47 with the directional clutches disengaged and engaged as the machine speed increases. The line 48 represents the speed of the fourth member 48 with the clutch 49 disengaged and engaged as machine speed increases.

INDUSTRIAL APPLICABILITY

In the use of the hydromechanical transmission 10 of the present invention the hydrostatic transmission 12 and the mechanical transmission interact to provide a continuously variable and efficient output which enables the engine 18 to operate at its best efficiency.

In operation of the hydromechanical transmission 10 of the subject invention, with the engine operating at a predetermined speed level, the pump 16 is at zero displacement, the clutches 44,45,49,56,64 are disengaged and the machine speed is zero. If the operator elects to move the machine forward, for example, from zero to approximately 2–3 mph, the motor clutch 44 is engaged to connect the motor to the second member 42, the clutch 45 of the gear change mechanism 36 is engaged to connect the gear 42A of the second member 42 to the output 38, the displacement of the pump 16 will move from its zero position to its maximum positive position to deliver pressurized fluid to the motor 22 to drive the first and second members 40,42 in opposite directions, the first member 40 will go from zero speed to its maximum negative speed, the second member 42 will go from zero speed toward its maximum positive speed, the third member 47 will go from zero speed to its maximum positive speed, the fourth member 48 will go from zero speed toward its maximum positive speed.

At line 102, which is approximately 2–3 mph, the gear ratio between the gears 47A,54 is fixed such that the gears are rotating at the same speed as the clutch 56 hub. The motor clutch 44 is disengaged and the forward directional clutch 56 is synchronously engaged for second gear speed and the clutch 45 remains engaged. From line 102, approximately 2–3 mph, to line 106, which is approximately 6.5–7.5 mph, the pump 16 moves from its maximum positive displacement to its maximum negative displacement, the first member 40 will go from its maximum negative speed to its maximum positive speed, the second member 42 will go to its maximum positive speed, the third member 47 will be connected to the engine by the engagement of the forward directional clutch 56 and will remain at its maximum positive speed which is engine speed, the fourth member 48 will go from its maximum positive speed toward zero speed.

At line 106 the clutch 45 is disengaged thus disconnecting the second member 42 from the output 38, the clutch 49 is engaged thus connecting the fifth member to the output 38, the forward directional clutch 56 remains engaged, the pump displacement 16 moves from its maximum negative position toward its maximum positive position, the first member 40 will go from its maximum positive speed toward its maximum negative speed, the second member 42 is disconnected from the output and will go from its maximum positive speed toward zero speed, the third member 47 remains connected to the engine 18 and will remain at its maximum positive speed, the fifth member 48 is now connected to the output 38 and will increase its positive speed.

It is recognized that the above description relates to a three speed hydromechanical transmission, however more clutches could be used to obtain higher speeds without departing from the scope of the invention. The speed of the machine can be increased from zero speed to some predetermined maximum speed level at a smooth and continuous manner. This is accomplished by the interaction of the hydrostatic transmission 12 and the mechanical transmission by engaging and disengaging clutches.

In the subject arrangement, the machine can be operated in reverse through the same speed ranges as set forth above with respect to operating in a forward direction. When being operated in a reverse direction the variable displacement pump 16 is stroked in a direction to provide pressurized fluid to the motor 22 in the opposite direction resulting in the machine being propelled in a reverse direction. In the reverse direction the clutch 45 is engaged, the motor clutch 44 is engaged from zero speed until machine speed increases until line 104 at which the motor clutch 44 is disengaged and the reverse directional clutch 64 is engaged. At line 108 the clutch 45 is disengaged and the clutch 49 is engaged.

Other aspects, objects and advantages of this invention can be obtained from a study of the drawing, the disclosure and the appended claims.

I claim:

1. A hydromechanical transmission having a hydrostatic transmission, a directional mechanism and an output, the hydromechanical transmission comprising:
    a planetary gearing mechanism;
    a first member of the planetary gearing mechanism connected to the hydrostatic transmission for rotation with the hydrostatic transmission;
    a second member of the planetary gearing mechanism being selectively connectable to the hydrostatic transmission and selectively connected to the output;
    a third member of the planetary gearing mechanism being connectable to the directional mechanism; and
    a fourth member of the planetary gearing mechanism selectively connectable to the output.

2. The hydromechanical transmission of claim 1 wherein the planetary gearing mechanism includes a first and a second planetary gear set each having a sun gear, a carrier with planetary gears and a ring gear.

3. The hydromechanical transmission of claim 1 wherein the first member is connected to a motor of the hydrostatic transmission.

4. The hydromechanical transmission of claim 3 wherein the second member is selectively connected to a motor of the hydrostatic transmission.

5. The hydromechanical transmission of claim 3 wherein the motor is a fixed displacement motor.

6. The hydromechanical transmission of claim 3 wherein the motor is a variable displacement motor.

7. The hydromechanical transmission of claim 2 wherein the first member includes the sun gears of the first and second planetary gear sets, the second member includes the carrier of the second planetary gear set, the third member includes the carrier of the first planetary gear set and the ring gear of the second planetary gear set, the fourth member includes the ring gear of the first planetary gear set.

8. The hydromechanical transmission of claim 7 including a gear change mechanism for selectively connecting the second and fourth members to the output.

9. The hydromechanical transmission of claim 8 wherein the gear change mechanism includes a first clutch for first and second gear and a second clutch for third gear.

10. The hydromechanical transmission of claim 9 including a second gear change mechanism having a third clutch for first and second gear and wherein the first gear change mechanism includes a first clutch for third gear and a second clutch for fourth gear.

11. A hydromechanical transmission having a hydrostatic transmission, a directional mechanism and an output, the hydromechanical transmission comprising:
    a planetary gearing mechanism including a first and a second planetary gear set each having a sun gear, a carrier with planetary gears and a ring gear;
    a first member of the planetary gearing mechanism connected to a motor of the hydrostatic transmission for rotation with the motor, the first member includes the sun gears of the first and second planetary gear sets;
    a second member of the planetary gearing mechanism being selectively connectable to the motor of the hydrostatic transmission and selectively connected to the output; the second member includes the carrier of the second planetary gear set;
    a third member of the planetary gearing mechanism being connectable to the directional mechanism, the third member includes the carrier of the first planetary gear set and the ring gear of the second planetary gear set; and
    a fourth member of the planetary gearing mechanism selectively connectable to the output, the fourth member includes the ring gear of the first planetary gear set.

* * * * *